United States Patent [19]

Hayes

[11] 4,121,591
[45] Oct. 24, 1978

[54] ANIMAL IDENTIFICATION TAG APPLICATION TOOL

[76] Inventor: Norman J. Hayes, P.O. Box 618, Cody, Wyo. 82414

[21] Appl. No.: 765,908

[22] Filed: Feb. 7, 1977

[51] Int. Cl.² .......................... G09F 3/12; A61B 17/00
[52] U.S. Cl. ........................................ 128/330; 227/144
[58] Field of Search .................. 29/268, 235, 758, 798, 29/788; 227/144, 67; 128/330

[56] References Cited

U.S. PATENT DOCUMENTS

| | | | |
|---|---|---|---|
| 1,647,042 | 10/1927 | Greenwald | 227/144 X |
| 3,013,269 | 12/1961 | Brierley | 227/144 |
| 3,091,770 | 6/1963 | McMurray | 227/144 X |
| 3,641,804 | 2/1972 | Oudenhoven | 128/330 X |
| 3,731,414 | 5/1973 | Murphy | 128/330 X |
| 3,812,859 | 5/1974 | Murphy | 128/330 X |

Primary Examiner—Jimmy C. Peters

[57] ABSTRACT

An animal identification tag application tool having a pair of pivotally mounted members with relatively fixed jaw portions on one member, including movable tag supporting means mounted on one jaw portion for linear movement relative to the other jaw portion, and movable cam means on the other member for engaging and actuating the movable tag supporting means.

23 Claims, 15 Drawing Figures

Fig_1

Fig_14

Fig_15

Fig_2

Fig_4

Fig_3

Fig_9

Fig_11

Fig_10

Fig_12

Fig_13

ANIMAL IDENTIFICATION TAG APPLICATION TOOL

BACKGROUND AND SUMMARY OF THE INVENTION

This invention relates to animal identificaton tag application tools and, more particularly, to an applicator tool for a two piece identification tag assembly.

While there have been many prior art attempts to develop satisfactory animal identification tools, to a certain extent the design and construction of such tools have been necessitated by particular animal identification tag designs. Nonetheless, there are certain desireable characteristics and problems common to various animal identification designs. For example, an applicator tool should be operable by minimum force and accomplish installation of a tag as quickly as possible with minimal injury to the animal and minimal potential of damage to the tag or injury to the person applying the tag. In addition, the ease of application of the tag must not compromise the permanence of attachment of the tag on the animal.

The present invention provides an applicator tool which enables easy operation by minimal force application, reduction in tag breakage resulting from application forces, fast application of the tag to the applicator tool and the animal, and fast and easy withdrawal of the tag from the applicator tool after mounting of the tag on an animal. The applicator tool is particularly adapted and arranged for use with a particular type of ear tag assembly to provide particularly beneficial results in combination therebetween.

DETAILED DESCRIPTION OF THE INVENTION

Figure 1:
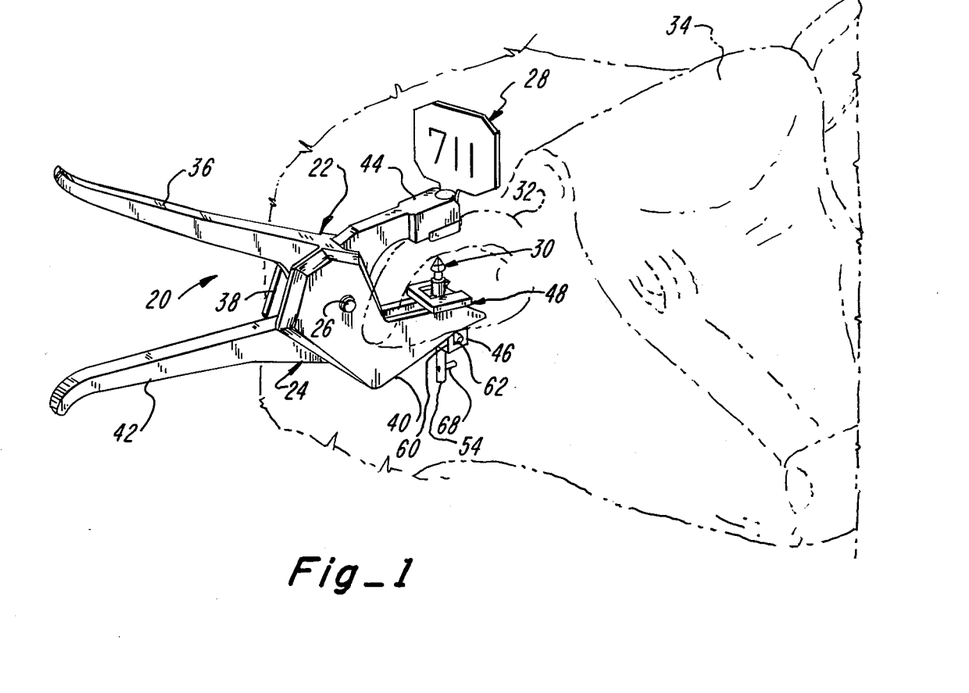
FIG. 1 is a schematic perspective view of an illustrative and presently preferred animal identification tag applicator tool in an open tag applying position relative to the ear of an animal.
Figure 13:
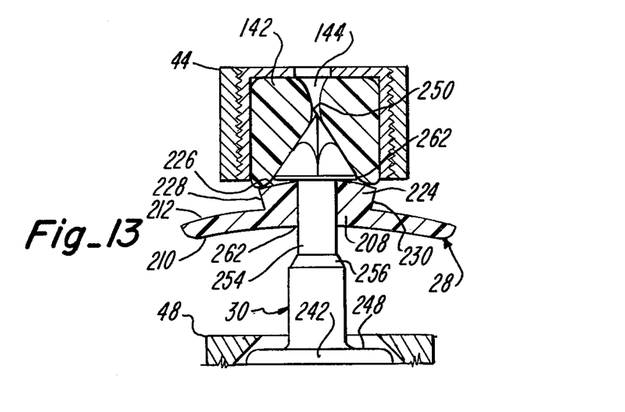

In general, as shown in FIG. 1, the animal identification tag applicator tool 20 of the present invention comprises a pair of pivotally connected lever members 22, 24 having a pivotal connecting means 26 enabling relative movement by manual hand applied force between an open tag loading position, as shown in FIG. 1, and a closed tag assembly position, as shown in FIG. 13, to associate, connect, and mount an upper identification tag member 28 and a lower connecting tag member 30 of a two piece animal identification tag assembly relative to the ear 32 of an animal 34, such as the bovine species, as generally described in my prior U.S. Pat. No. 3,958,353, and my U.S. patent application Ser. No. 765,909 being filed concurrently herewith, the disclosures of which are incorporated herein by reference.

The lever member 22 comprises an upper handle portion 36 and a pair of spaced parallel lower cam jaw portions 38, 40 relatively fixedly connected thereto. The lever member 24 comprises a lower handle portion 42 and upper and lower spaced relatively fixed jaw portions 44, 46 fixedly connected thereto. A linearly movable tag member supporting and force application means 48 is movably mounted on and supported by jaw portion 46 for movement relative thereto between an open tag loading position and a closed tag assembly position by linearly directed forces applied through cam means in the form of said cam jaw portions 38, 40 as the handle portions 36, 42 are moved toward one another about the pivotal connecting means 26 against the bias of compression spring means 49.

The tag member supporting and force application means 48 comprises a plate member 52 fixedly attached to a pin member 54 by suitable fastening means such as a threaded fastener 56. Pin member 54 is slidably mounted in a bore 58 in an elongated transversely extending housing portion 60 on the outer end of jaw portion 46 for linear movement relative thereto between an open tag loading position (FIG. 2) and a closed tag assembly position (FIG. 13). Pin member 54 is held and located in bore 58 by a first transverse pin 62 mounted in opposite parallel guide slots 64, 66 and by a second transverse pin 68 engageable with the bottom surface 70 of housing portion 60.

Figures 2, 3, 4:
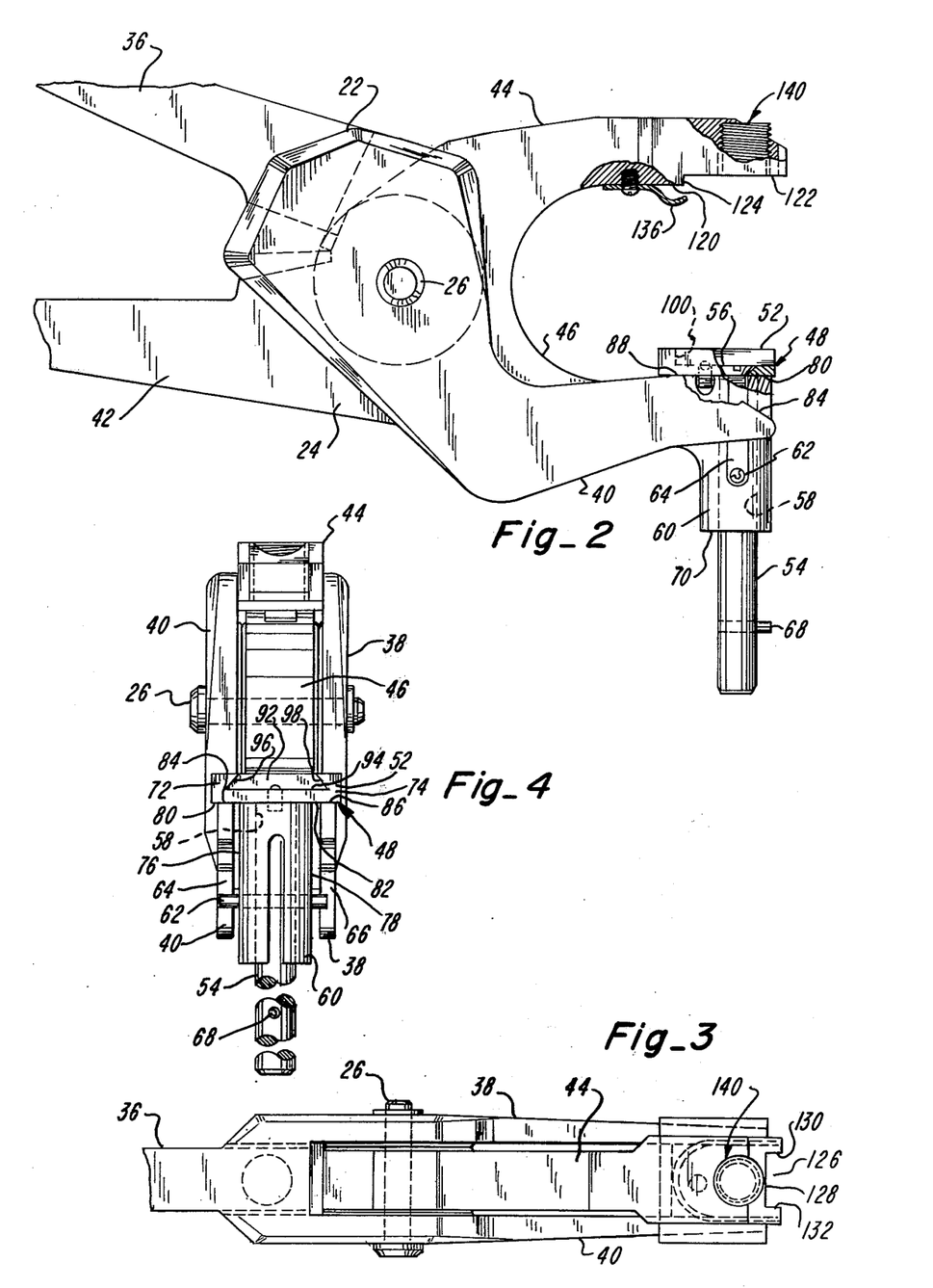
FIG. 2 is a partial side elevational view of the tool of FIG. 1.
FIG. 3 is a top view of the tool of FIG. 2.
FIG. 4 is an end view of the tool of FIG. 2.

Plate member 52 has side portions 72, 74, FIG. 4, extending laterally outwardly beyond the side wall surfaces 76, 78 of jaw portion 46 and housing portion 60 to provide cam abutment surfaces 80, 82 therebeneath for engagement with upwardly facing cam surfaces 84, 86 on the outer end portions of jaw portions 38, 40 of lever member 22. The cam surfaces 84, 86 include first relatively short length portions 88, FIG. 2, engageable with surfaces 80, 82 during the initial movement of the support means 48 toward the assembly position when application forces are minimal and second relatively long length portions 90, FIG. 5, engageable with surfaces 80, 82 during the assembly of the tag members when application forces are maximal. Thus, the arrangement is such as to provide connecting cam means between the jaw portions 38, 40 of lever member 22 and the movable mounting means 48 for causing linear movement of the mounting means relative to jaw portions 44, 46 of lever member 24 between the tag loading position and the tag assembly position.

Figures 5, 6, 7, 8:
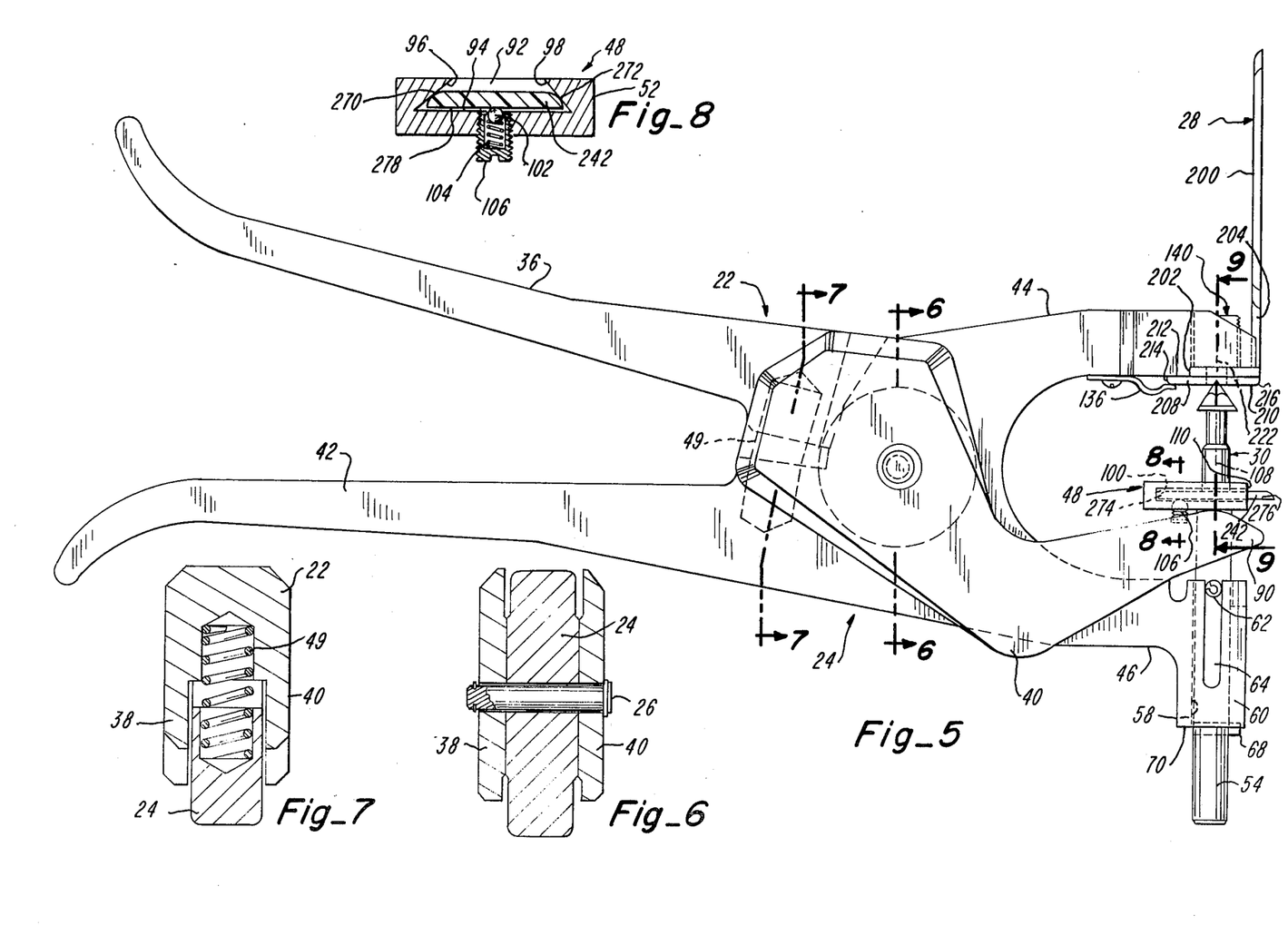
FIG. 5 is a side elevational view of the tools of FIGS. 1-4 in an intermediate closing position.
FIGS. 6-8 are cross-sectional views of the tool of FIGS. 1-5 taken along the correspondingly numbered section lines of FIG. 5.

Referring to FIGS. 4 and 8, plate member 52 further comprises an elongated tag mounting slot 92 defined by a flat abutment surface 94, oppositely inclined side surfaces 96, 98 and an end wall abutment surface 100, FIG. 2. Detent means for releasably engaging the base portion of the lower connecting tag member 30 in the mounting slot 92 comprises a ball detent member 102, FIG. 8, biased by a compression spring 104 is mounted in a threaded adjustable housing member 106 in member 52 beneath and in general alignment with the central longitudinal axis of the slot 92 in laterally inwardly offset relationship to the central longitudinal axis 108, FIG. 5, of the pin member 54. The ball member 102 protrudes into slot 92 through the bottom surface 94 thereof to resiliently frictionally releaseably engage and hold the bottom surface of the base portion of the tag connecting member 30. Slot 92 is dimensioned so as to substantially correspond to the cross-sectional configuration of the base portion of the tag connecting member 30 whereby the base portion is slidably frictionally retained therewithin in the loading position and during movement to the assembly position. The outer end 110, FIG. 5, of slot 92 is open and unrestricted to enable insertion of the base portion of the tag member 30 and to enable removal thereof after assembly by forces applied thereto transversely to the line of application of assembly forces along central axis 108. Thus, the arrangement is such as to provide releasable retaining means for releasably retaining the tag member 30 in slot 92 on abutment surface 94 during application to the tag member of linearly directed forces transverse to the abutment surface during movement from the loading position to the assembly position and for releasing the tag member for outward sliding movement relative to the slot and the abutment surface after assembly upon application of forces parallel to the slot and abutment surface.

As shown in FIGS. 2, 3, and 5, the jaw portion 44 of lever member 24 has a pair of offset parallel flat lower abutment surfaces 120, 122 connected by a transverse shoulder surface 124 generally aligned with and parallel to abutment surface 94 of slot 92 and transverse to the central axis 108. An outwardly facing slot 126, FIG. 3, in the outer end portion of jaw portion 44 is defined by a flat abutment surface 128 and flat side surfaces 130, 132 which extend generally parallel to central axis 108 and transversely to surfaces 120, 122. Surfaces 120, 122, 124, 128, 130, 132 are dimensioned and arranged to generally correspond to the cross-sectional configuration of the base portion and connecting flange portion of the identification tag member 28 to enable correspondinng tag surfaces to be seated thereagainst and frictionally releasably held thereby with the connecting hole in the base portion in axial alignment with central axis 108. A spring member 136 may be mounted on jaw portion 44 in cooperative association with surface 120 for resilient frictional releasable retaining engagement with the base portion of the tag member 28. The arrangement is such as to provide releasable tag retaining means associated with the abutment surfaces 120, 122 for holding the tag member 28 during the movement from the tag loading position to the tag assembly position during application of assembly forces transverse to the abutment surfaces and for releasing the tag member after assembly upon application of forces parallel to the abutment surfaces.

In order to accommodate the head portion of the tag connecting member 30 during assembly, suitable enlarged cavity means 140 are provided in the jaw portion 44 opposite the head portion and in axial alignment therewith. In a presently preferred embodiment, shown in FIGS. 9–13, the cavity means comprises a resilient compressible annular member 142 having a central bore 144 and mounted in a threaded annular housing member 146 adjustably fastened in the jaw portion 44.

Figures 14, 15:
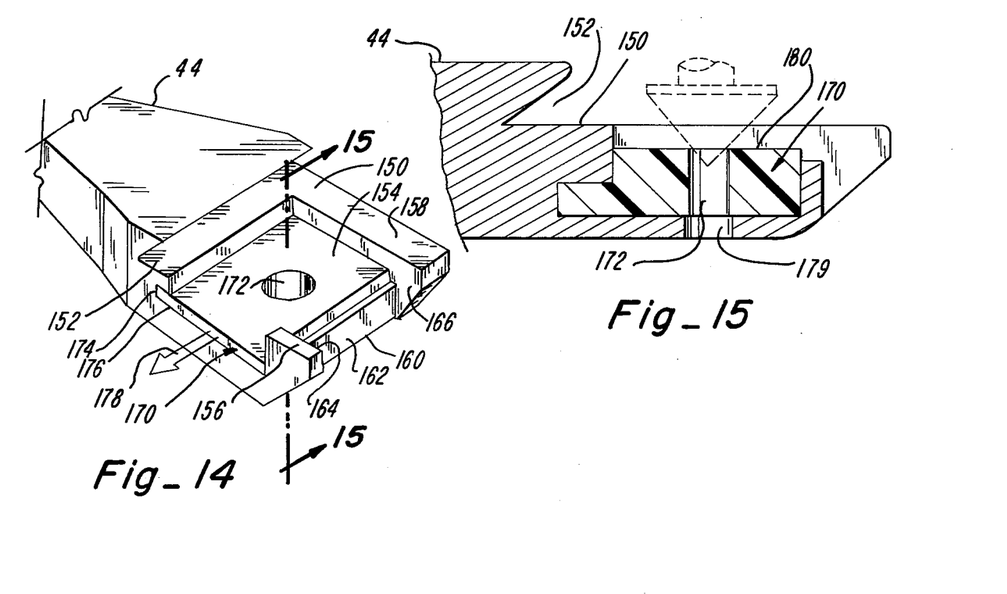
FIG. 14 is a partial perspective view of an alternative form of one jaw of the tool of FIGS. 1-13.
FIG. 15 is a cross-sectional view taken along line 15—15 of FIG. 14.

Referring now to FIGS. 14 & 15, another alternative form of the jaw portion 44 of the lever means 22 is shown to comprise a flat abutment surface 150 having an undercut retaining groove 152 at the inner end thereof in which the inner end of the base portion of the identification tag member 28 is slidably frictionally releasably receivable. A central slot 154 separates surface 150 into spaced parallel surface portions 156, 158 and provides cavity means for receiving the conical head portion of the tag member. An outwardly facing slot 160 is defined by an abutment surface 161 and side abutment surfaces 164, 166 as previously described. A resilient compressible cushion means 170 made of a plastic-like material, such as urethane 80A to 120A Shore hardness, may be mounted in slot 154 with a central bore 172 having a diameter approximately equal to or somewhat less than the diameter of the hole in the base portion of the tag member 28 coaxially aligned with the conical head portion of tag member 30 and central axis 108. As shown in FIG. 14, a retention slot 174 and a side slot 176 may be provided in jaw portion 44 to enable lateral outward expansion of the cushion in the direction of arrow 178 during assembly of the tag members as the conical head portion enters the bore 172 as shown in FIG. 15. A pressure relief bore 179 may be provided in coaxial alignment with bore 172. The upper surface 180 of member 170 is spaced from surface 150 a distance approximately equal to the thickness of the reinforcement rib portion of the tag member 28 and the width and length of slot 154 are such as to slidably receive the reinforcement rib portion therewithin with the upper surface of the base portion supported on surfaces 150, 156, 158. The area of surface 180 is greater than the maximum diameter of the conical head portion to enable full penetration of the conical head portion into the member 170 while supportively engaging the outer upper surface of the reinforcement rib portion.

Figure 9:
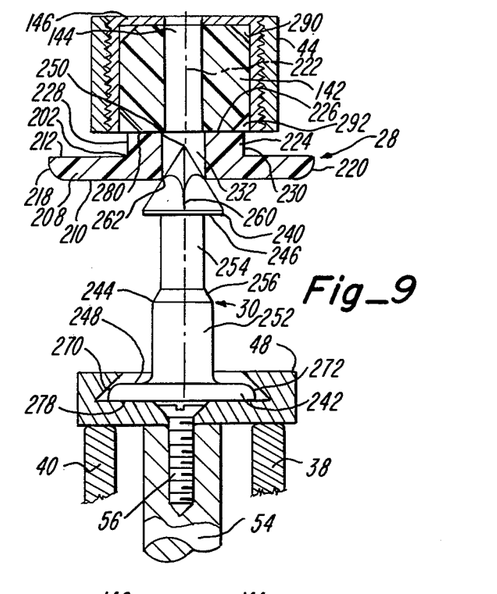
FIGS. 9-13 are partial sectional views of the tool of FIGS. 1-8 in various progressively closing positions.

Referring now to FIGS. 5 and 9, the identification member 28 is made of one-piece molded plastic material such as urethane 80A to 100A Shore hardness having an upright identification flange portion 200, a transversely extending base portion 202 laterally offset to one side of the flange portion, and a connecting flange portion 204 extending therebetween.

The base portion 202 comprises an enlarged bottom portion 208 of relatively thin wall thickness of, for example, 1/16 inch as measured between a bottom support surface 210 and an upper surface 212 both of which extend transversely relative to the flange portion 200. Bottom portion 208 has a generally elliptical peripheral configuration defined by opposed parallel side edge surfaces 214, 216 and opposed semi-circular side edge surfaces 218, 220. In the presently preferred embodiment, the distance between surfaces 214, 216 is approximately ⅝ inch and the maximum distance between the end portions of surfaces 218, 220 is approximately 1-¼ inches. Surface 216 is substantially coplanar with the adjacent side surface of the flange portion 204. The central longitudinal axes of flange portions 200, 204 and the transverse central axis of the base portion 202 are coplanar with central axis 222 as indicated in FIG. 9 and the transverse central axis of the base portion is transversely offset from the flange portion approximately 7/16 inch as indicated by central axis 222 in FIG. 5.

The base portion 202 further comprises a rib portion 224 having a thickness of approximately 1/16 in the presently preferred embodiment as measured between surface 212 and surface 226. The rib portion is of generally rectangular peripheral configuration and has a width of approximately ½ inch as measured between side surfaces 228, 230 equal to the width of connecting flange portion 204.

An annular attachment hole 232, having a relatively small diameter of approximately 5/32 inch, is centrally located in base portion 202 and extends vertically parallel to flange portion 200 and connecting flange portion 204 through both the bottom portion 208 and the rib portion 224 of the base portion 202.

The tag connecting member 30 is made of one piece of relatively hard plastic material, such as 30% glass filled Nylon 6. As shown in FIG. 9, member 30 comprises a head portion 240, an elongated base portion 242, and an annular connecting shaft portion 244. An abutment surface 246 on head portion 240 and an abutment surface 248 on base portion 242 are provided to respectively abut identification member surface 226 and the underside of the ear of an animal in an assembled position (not shown) with shaft portion 244 extending through a puncture wound opening in the animal ear caused by conical pointed surface 250 of the head portion and through the annular hole 232 in the base portion 202. The dimensional relationsips of the connecting member 30, the thickness of the animal ear, and the base portion 202 of the identification member 28 are such as to enable the bottom surface 210 to be firmly seated on the upper surface of the animal ear and hold the identification member in a upright outwardly extending position relative to the outer surface of the animal ear.

The shaft portion 244 has a first relatively large diameter shaft portion 252 of approximately ¼ inch diameter next adjacent the base portion 242 and a second relatively small diameter shaft portion 254 of approximately 3/16 inch diameter next adjacent the head portion 240. Locating and abutment shoulder means, in the form of an annular tapered connecting surface 256 connecting the shaft portions 252, 254, is provided on shaft portion 252 intermediate the abutment surfaces 246, 248, approximately 7/16 inch from surface 246 and approximately 5/16 inch from surface 248, for holding and locating the base portion 202 of the identification member 28 thereon in limited axially slidable relationship relative thereto. Thus, in the initial assembled portion of FIG. 13, there is substantial clearance between surface 210 of the base portion 202 of the identification member and the shoulder means 256 so that, if the thickness of the animal ear is less than the distance between surface 248 of the base portion 242 of the connecting member 30 and the surface 210, the base portion 202 can be moved along shaft portion 254 toward shoulder 256 until the surface 210 is seated on the upper surface of the animal ear. In addition, if the animal is not full grown at the time of application of the tag, the base portion 202 can be moved away from the shoulder 256 to accomodate increases in thickness of the animal ear. The relatively small diameter shaft portion 254 also facilitates passage of the conical head portion 240 through hole 232 and retention of the base portion 202 by the conical head portion after assembly as hereinafter described. The relatively large diameter shaft portion 252 also provides sufficient strength to prevent breakage of the shaft portion during assembly which has been a major problem with prior art devices.

The presently preferred form of conical head portion 240 has four equally spaced relatively sharp edged penetrating rib means, illustrated at 260, extending from the sharp conical point 250 toward the surface 246 which has an annular periheral surface 262. The uppermost portion 264, FIG. 10, of the conical head portion, next adjacent the point 250, has a pryamidal configuration defined by flat tapered surfaces which intersect at 45° angles to form the upper portions of the sharp edged penetrating rib means 260 and which are extended axially toward the peripheral edge surface to form the lower portions of the sharp edged penetrating rib means, the upper flat tapered surfaces merging with the lower conical surface of the head portion 240 as indicated at 266, FIG. 10.

As shown in FIGS. 5, 8 and 9, the base portion 242 of connecting member 30 further comprises spaced parallel elongated side surfaces 270, 272, FIGS. 8 and 9, and oppositely curved connecting end surfaces 274, 276, FIG. 5, with the base portion having a maximum length of 1-5/32 inches and a maximum width of approximately ⅜ inch so as to be readily nestable in the central main groove found in the upper inner part of the ear of a bovine type animal. The thickness of the base portion 242, as measured between surface 248 and bottom surface 278, may be relatively thin, e.g., approximately 1/16 inch, because of the high strength of the attachment member material which facilitates the application of the tag to the animal by use of an applicator as will be hereinafter described. The peripheral side surfaces 270, 272 of the base portion are beveled at an angle of approximately 60° for a purpose to be hereinafter described.

In operation, the connecting member 30 is mounted in the retainer means associated with the outer end of the lower jaw portion 46 and provided by the slot 92 in member 52 with the longitudinal axis of the base portion extending parallel to the longitudinal axis of the lower jaw portion as shown in FIG. 5. The inclined side surfaces 270, 272 of the base portion 242 are slidably received in the grooves 96, 98 of the retaining slot means 92 and frictionally held therewithin. The inner end surface 274 is located against stop means 100 to properly locate the shaft portion 244 and piercing point 250 relative to the upper jaw portion 44 and the identification member 28 as mounted thereon. The bottom surface 278 of the base portion 242 engages the spring biased detent means 102 to apply force thereagainst to urge side surfaces 270, 272 into frictional engagement with groove surfaces 96. 98.

The identification member 28 is mounted in the retainer means in the outer end of the upper jaw portion 44 with the longitudinal axis of the base portion 202 extending transversely to the longitudinal axis of the upper jaw portion. The inner end 214 of the base portion 202 is slidably received by the inner retainer slot means, provided by surface 120 and spring 136 of FIG. 2 or the slot 152 of FIGS. 14 and 15, and frictionally held therewithin. The connecting portion 204 is slidably received in the outer retaining slot means 126, FIG. 3, and frictionally held therewithin. The inner side surface of the connecting flange portion 204 abuts the abutment surface 128 with the shaft hole 232 located in axial aligned relationship with the cushion hole 144 and the shaft portion 244 of the connecting member.

Then the animal ear is placed between the upper and lower jaw portions with the elongated inner ear groove generally longitudinally aligned with the longitudinal axis of the jaw portions and the base portion 242 of the connecting member with the inner surface of the animal ear located adjacent the piercing point 250 of the connecting member and the bottom surface 210 of the base portion 202 of the identification member located adjacent the upper surface of the animal ear.

In general, the upper and lower portions of the applicator tool are movable between open and closed positions to attach the tag to the animal ear by forcing conical head portion of the attachment member 30 through the animal ear from the bottom surface to the upper surface of the central upper portion of the animal ear next adjacent the animal head, as described in my prior U.S. Pat. No. 3,958,353, and then through the hole 232 in the base portion 202 of the identification member 28. While the tag assembly described hereinbefore may be applied by any suitable applicator tool, the applicator tool preferably includes resilient cushion and support means 142 or 170 for abutting engagement with the upper surface 226 of the rib portion 224 of the identification member 28 and with the peripheral surface of the conical head portion 240 of the connecting member 30 during the assembly process while accomodating the upward movement of the conical head portion 240 beyond surface 226 of the reinforcement rib portion 224. As shown in FIGS. 9-13, the resilient cushion and support means 142 may be in the form of an annular member made of plastic material such as urethane 80A to 120A Shore hardness providing an annular abutment surface 280 opposite and abuttingly engageable with portions of surface 226 circumjacent bore 232 and an annular bore 144 aligned with bore 232, conical head portion 240, and shaft portion 244.

Referring now to FIG. 9, the applicator tool jaw portions 44, 48 are shown in a partially closed position whereat the upper portion 264 of the conical head portion 240 has penetrated and passed through the upper surface of the animal ear, and reached a position in bore 232 of the identification member whereat the bottom peripheral edge 262 makes initial contact with the peripheral surface of the conical head portion 240.

Figure 10:
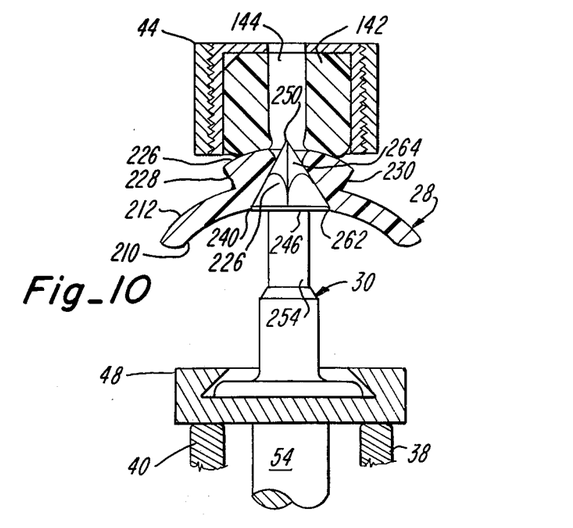

FIG. 10 shows an assembly position subsequent to FIG. 9 whereat the bottom surface 246 of the conical head portion has passed completely through the animal ear and is located substantially parallel to the bottom edge 262 of hole 232. The construction of the enlarged bottom flange portion 208 and the reinforcement rib portion 224 and the conical head portion 240 is such that the base portions 208, 224 bow outwardly on both sides of the central axis 222 with surfaces 210, 212, 226 having substantial convex curvatures and side surfaces 228, 230 being substantially outwardly upwardly inclined relative to the axes of hole 232, conical head portion 240, and shaft portion 244. The hole 232 is generally resiliently enlarged by the conical head portion. The cushion means 142 may be provided with suitable expansion means in the form of annular recessed portions 290, 292 for further accomodating the expansion of the cushion means as forces are applied thereto by the conical head portion 240 or in the form of suitable recesses in plug member 146 and jaw portion 44 as may be necessary or desireable.

Figure 11:
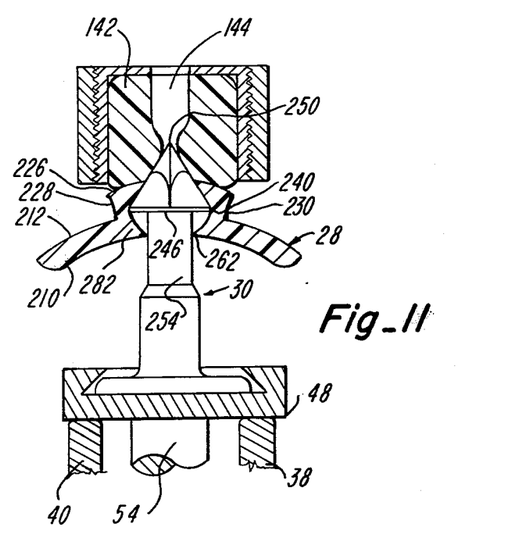

FIG. 11 shows an assembly position subsequent to FIG. 10 whereat the bottom surface 246 is located approximately midway along hole 232 in general alignment with the intersection of upper surface 212 and side surfaces 228, 230. The construction of the enlarged bottom flange portion 208 and the reinforcement rib portion 224 in relationship to the conical head portion 240 and relatively small diameter shaft portion 254 is such that the outward bowing action continues with further opening of the bore 232 to accomodate the conical head portion. At the same time, the lower portions 282 of the material circumjacent hole 232, which are subject to the forces applied by the conical head portion and which store energy resulting therefrom, begin to expand inwardly toward reduced diameter shaft portion 254 and apply force behind the conical head portion in the upward direction of movement thereof to facilitate further axial upward displacement thereof through the bore 232.

Figure 12:
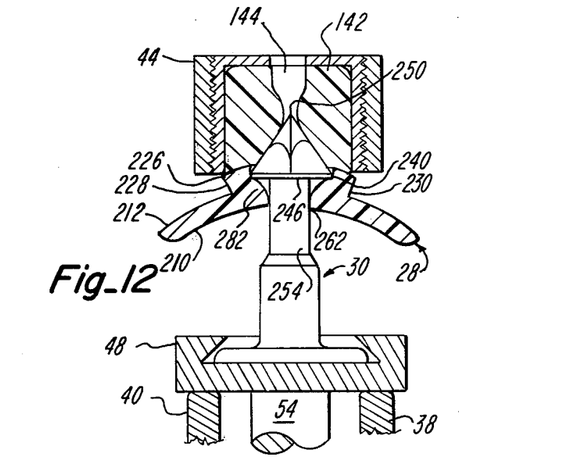

FIG. 12 shows an assembly position subsequent to FIG. 11 whereat the bottom surface 246 is located approximately ¾ of the way through hole 232. The construction of the enlarged base bottom portion 208 and the reinforcement rib portion 224 in relationship to the conical head portion 240 and the relatively small diameter shaft portion 254 is such that the outward bowing action continues with further opening of the top portion of bore 232 and further closing of the bottom portion 282 of bore 232 with maximum internal forces in the base portion 202 being exerted against surface 246 to urge the conical head portion on through the bore. In fact, at this point, the internally generated forces are generally sufficient to complete the movement of the conical head portion through the bore 232 even upon removal of jaw applied force.

FIG. 13 shows the final assembly position after surface 246 has passed beyond upper surface 226. At this point, some residual bowing of base portions 208, 224 is still evident so that some upwardly directed internal forces are still effective against surface 246. The residual bowing effect is probably the result of the difference of approximately 1/32 inch in the diameter of the hole 232 and the shaft portion 254 which creates frictional force between those surfaces retarding further movement of the base portion 202 relative to the shaft portion 254. Since the upper surface of the animal ear has a generally convex curvature, the convex curvature of bottom surface 210 may be an advantage. In any event, if force is applied to the base portion 202 opposite to the assembly forces, the base portion 202 will slide down the shaft portion 254 toward the top surface of the animal ear with relief of remaining residual forces and termination of the bowed condition. In any event, the relatively high degree of flexibility of the enlarged rim portion 208 enables conformation to the upper curved surface of the animal ear. Nonetheless, the relatively large area of abutting engagement between surface 246 of head portion 240 and the upper surface 226 of the reinforcement rib portion 224; the frictional engagement between the surface of bore 232 and reduced diameter shaft portion 254; and the rigidifying effect of reinforcement rib 224 against movement of the conical head portion in a direction opposite to the direction of insertion, preclude the removal of the identification member relative to the attachment member under substantially any forces which may be accidentally applied to the identification member after mounting on the animal ear.

Thus, the arrangement and construction of the base portion 202 of the identification member, and the conical head portion 240 and the shaft portion 254 of the connecting member 30 provide application force assist means for assisting the insertion of the conical head portion 240 through hole 232 and provide retention means effective after insertion for preventing removal and disassociation of the base portion 202 of the identification member from the conical head portion 240 of the attachment member while also providing adjustment means for variable axial positioning of the base portion 202 relative to shaft portion 244.

The arrangement of the cushion means 142 and the conical head portion 240 is such that the portions of the upper surface 226 of the reinforcement rib portion 224, circumjacent the attachment hole 232, are resiliently forcibly held against upper inward movement toward axis 222 so as to prevent binding between the conical head portion 240 and the upper jaw portion 44. As illustrated in FIG. 9, the diameter of hole 144 may be slightly smaller than the diameter of hole 232. As shown in FIGS. 10–13, the surface 280 of the cushion means continues to fully engage and resiliently restrain the portions of upper surface 226 circumjacent the hole 232 throughout the assembly operation and during at least a portion of the assembly operation the side surface of hole 144 is in engagement with the peripheral surface of the conical head portion to prevent upward inward flow of material circumjacent the hole 232 in the reinforcement rib portion 224 therebetween.

As soon as the conical head portion 240 reaches the approximate position of FIG. 12, the person applying the tag should be able to sense a reduction in resistance force and the assembly operation may be completed without further penetration of the conical head portion into the hole 144 by reason of the residual internal forces in the base portion 202 as previously described. In any event, the conical head portion is very quickly disassociated from the cushion means 142 and moved backward beyond the surface 280 and the adjacent jaw surfaces 122 by the spring action of the residual expansion forces of cushion means 142 or 170 and of the compression spring means 49. As soon as the conical head portion clears the cushion means surface 280, and probably sooner to the extent permitted by the resilience thereof, the assembled tag is movable outwardly relative to the jaw portions of the applicator tool with base portion 202 of the identification member 28 sliding transversely outwardly along surfaces 120, 122 of jaw portion 44 and flange portion 204 moving outwardly away from surfaces 128, 130, 132 and with base portion 242 of connecting member 30 simultaneously sliding transversely outwardly along surfaces 94, 96, 98 of the slot means 92 of member 52. Thus, as soon as the assembly operation is complete, or perhaps even before, the assembled tag may be very quickly disassociated from the applicator tool thereby enabling the tool operator to move himself and the applicator tool clear of the animal in a minimum amount of time.

It is contemplated that the inventive concepts herein disclosed may be variously otherwise embodied and it is intended that the appended claims be construed to include alternative embodiments of the invention except insofar as limited by the prior art.

What is claimed is:

1. In an animal identification tag applicator tool device for applying and assembling two tag members of an animal identification tag assembly; the tag assembly comprising one tag member with a retaining head portion on a shaft portion extending transversely from a base portion and another tag member having a retaining hole in a base portion for receiving the retaining head portion; the applicator tool device comprising first and second relatively movable jaw portions each having opposed tag member mounting and abutment means engageable with and holding one or the other of the base portions of the tag members during an assembly operation whereby the head portion of the one tag member is forced through the animal ear and then through the retaining hole of the other tag member; the invention wherein the tag member mounting and abutment means for the one tag member comprising:

a flat rigid force transfer surface means for continuous abutting engagement with and continuous application of assembly force to the entire base portion of the one tag member during passage of the retaining head portion through the animal ear and through the retaining hole in the base portion of the other tag member;

rigid retaining surface means spaced from and overlying the peripheral portions of said flat rigid force transfer surface means for limiting movement of the base portion of the one tag member relative to the flat rigid force transfer surface means; and movable detent means extending through said flat rigid force transfer surface means for resiliently engaging the base portion of the one tag member and moving the base portion away from the flat rigid force transfer means toward and into engagement with said rigid retaining surface means prior to contact of the head portion with the animal ear and thereafter enabling movement of the base portion into full abutting force transfer engagement with said flat rigid force transfer surface means during movement of the head portion through the animal ear and through the retaining hole.

2. The invention as defined in claim 1 and wherein:

said force transfer surface means and said rigid retaining surface means defining a slot means having an opening at the laterally outermost end for free sliding insertion and withdrawal of the base portion of the one tag member; and a fixed rigid abutment surface means at the laterally innermost end of said slot means opposite said opening means for free sliding abutting engagement with the base portion of the one tag member for locating the head portion and the shaft portion in axial alignment with the retaining hole in the other tag member.

3. The invention as defined in claim 2 and wherein said movable detent means comprising:

a bore in the one of said jaw portions extending transversely to and through said force applying surface means;

a ball member mounted in and confined within said bore for movement relative to said force applying surface means between an extended position and a retracted position; and spring means mounted in said bore and engaging said ball member for biasing said ball member toward the extended position whereby the base portion of the one tag member being engageable with said rigid retaining surface means and for enabling movement of said ball member toward the retracted position whereby the base portion of the one tag member being engageable with said rigid force transfer surface means.

4. The invention as defined in claim 3 and further comprising:

adjustment means operably associated with said detent means for adjusting the force applied to said ball member by said spring means.

5. In an animal identification tag applicator tool device for applying and assembling an animal identification tag assembly on the ear of an animal, the tag assembly comprising first and second tag members with one tag member having a retaining head portion on a shaft portion and the other tag member having a retaining hole for receiving the retaining head portion; the applicator tool device comprising first and second relatively movable jaw portions having opposed flat tag member mounting and supporting surfaces for mounting and supporting the tag members during assembly by forcing the head portion of the one tag member through the animal ear and then through the retaining hole of the other tag member; the mounting and support surface for the other tag member having a resilient cushion and abutment means mounted in the jaw portion which support the other tag member and forming part of the tag mounting and support surface thereof for abutting the surface portions of the other tag member circumjacent the retaining hole therein during passage of the head portion through the hole; the invention comprising:

removable and adjustable housing means for removably and adjustably holding said resilient cushion and support means on the jaw portion which supports the other tag member.

6. The invention as defined in claim 5 and wherein:
said resilient cushion and abutment means having a generally cylindrical peripheral configuration.

7. The invention as defined in claim 5 and further comprising:
expansion means integral with said cushion and abutment means for enabling expansion thereof within said housing means during application of assembling force thereto.

8. The invention as defined in claim 7 and wherein said expansion means comprising:
gaps between said resilient cushion and abutment means and said housing means.

9. The invention as defined in claim 5 and wherein:
said housing means having a cylindrical chamber therewithin defined by a cylindrical side wall portion and an annular abutment wall portion extending thereacross at one end thereof and an annular opening opposite said annular abutment wall portion;
said resilient cushion and abutment means having a cylindrical peripheral configuration defined by a cylindrical side wall portion and oppositely spaced annular end wall portions extending thereacross;
said resilient cushion and abutment means being mounted in said chamber of said housing means with the cylindrical side wall portion of said resilient cushion and abutment means in abutting confining relationship with said cylindrical side wall portion of said housing means, and with one of said oppositely spaced end wall portions in abutting confining relationship with said annular abutment wall portion, and with the other of said oppositely spaced end wall portions located in generally coplanar relationship with said annular opening.

10. The invention as defined in claim 9 and further comprising:
expansion gap means between said housing means and said resilient cushion and abutment means for enabling resilient expansion of said resilient cushion and abutment means relative to said housing means.

11. The invention as defined in claim 10 and wherein said expansion gap means comprising:
at least one annular reduced diameter surface portion of said cylindrical side wall portion of said resilient cushion and abutment means.

12. The invention as defined in claim 11 and wherein:
there being at least one annular reduced diameter portion located adjacent the intersection of said annular abutment wall portion and said cylindrical side wall portion of said chamber.

13. The invention as defined in claim 12 and wherein:
there being at least one other annular reduced diameter portion located adjacent the intersection of said annular opening and said cylindrical side wall portion of said chamber.

14. The invention as defined in claim 5 and further comprising:
an annular threaded opening in said jaw portion; and
thread means on said housing means for threadably removably and adjustably mounting said housing means in said annular threaded opening in said jaw portion.

15. The invention as defined in claim 5 and wherein said resilient cushion and abutment means having a hole therein aligned with the retaining hole in the other tag member to receive the head portion.

16. The invention as defined in claim 15 and wherein said hole in said resilient cushion and abutment means having a diameter less than the maximum diameter of the head portion.

17. The invention as defined in claim 16 and further comprising:
pressure relief hole means connected with said hole for enabling escape of air after contact between the head portion and the portions of said resilient cushion and abutment means circumjacent said hole.

18. An animal identification tag applicator tool device for applying and assembling a two piece animal identification tag assembly, comprising first and second tag members, on the ear of an animal by forcing a retaining heat portion on a shaft portion on one tag member through the animal ear and then through a retaining opening in the other tag member, the applicator tool device comprising:

a first lever member having a pair of fixedly spaced jaw portions on one end thereof defining a jaw cavity therebetween and a handle portion on the other end thereof;
a second lever member having a jaw portion at one end thereof being movable relative to said pair of fixedly spaced jaw portions and a handle portion at the other end thereof;
pivotal connecting means for pivotally connecting intermediate portions of said first lever member and said second lever member for enabling relative pivotal movement of said first lever member and said second lever member between a first open position whereat said movable jaw portion is located next adjacent one of said fixedly spaced jaw portions and a second closed position whereat said movable jaw portion is located next adjacent the other of said fixedly spaced jaw portions;
plate means movably mounted in said jaw cavity and operably associated with said one of said fixedly spaced jaw portions for linear movement between a retracted position located next adjacent said one of said fixedly spaced jaw portions and an extended position located next adjacent said other of said fixedly spaced jaw portions;
a first tag member supporting means on said plate means including a tag member abutment surface extending transversely to the path of movement of said plate means and facing said other one of said fixedly spaced jaw portions for releasably supporting and applying assembly force to said first tag member during movement of said plate means between said retracted position and said extended position;

a second tag member supporting means on said other of said fixedly spaced jaw portions including a tag member abutment surface extending transversely to the path of movement of said plate means and facing said one of said fixedly spaced jaw portions for releasably supporting and holding said second tag member during assembly of the tag members; and cam means operably associated with and connecting said movable jaw portion and said plate means for causing movement of said plate means from the retracted position to the extended position and for applying assembly force parallel to the path of movement of said plate means between said one of said fixed jaw portions and said plate means, the cam means comprising:

a force transfer cam surface on said plate means extending laterally in parallel spaced relationship to said flat transverse abutment surface in said slot means; and a force applying cam surface on the outer end portion of said second lever member facing the direction of movement from the retracted position to the extended position and being continuously engageable with said force transfer cam surface during movement from the retracted position to the extended position.

19. The invention as defined in claim 18 and wherein:
said force transfer cam surface being flat and extending at least from the innermost end portion of the flat bottom portion of the tag member to the shaft portion of the tag member in the retracted position in said slot means; and
said force applying cam surface being engageable with varying laterally spaced portions of said force transfer cam surface during movement from the retracted position to the extended position and being engageable with a portion of said force transfer cam surface directly opposite the shaft portion of the tag member during assembly of the tag members.

20. The invention as defined in claim 18 and wherein:
said jaw portion on said lever member and said cam means being located between said plate means and said one of said fixedly spaced jaw portions in the retracted position and in the extended position and during movement of said plate means therebetween, whereby the cavity space between said plate means and said other of said fixedly spaced jaw portions and the first and second tag member supporting means being unobstructed by said jaw portion and said cam means.

21. The invention as defined in claim 18 and wherein:
said cam means being located between said movable jaw portion and said plate means for continuous application of assembly force to said plate means in the same direction as the movement of said plate means from the retracted position to the extended position.

22. The invention as defined in claim 18 and being constructed and arranged for applying and connecting an animal identification tag assembly wherein, in the assembled position, the first tag member comprises a lowermost base portion having flat spaced parallel upper and lower surfaces, spaced laterally extending side surfaces, laterally innermost and laterally outermost side surfaces, a connecting shaft portion connected to the lowermost base portion and extending transversely upwardly therefrom beyond the upper surface thereof, and an enlarged uppermost attachment head portion on the uppermost end of the shaft portion; and the second tag member comprises a lowermost base portion having flat spaced parallel upper and lower surfaces, spaced laterally extending side surfaces, laterally innermost and laterally outermost side surfaces, a reduced width reinforcement rib portion on the upper surface of the base portion having a flat upper surface extending parallel to the upper surface of the base portion and having spaced parallel generally vertically extending side surfaces inwardly offset relative to the generally vertically extending side surfaces of the base portion and a laterally innermost generally vertically extending side surface, an enlarged width identification portion extending generally vertically upwardly from the base portion and the reinforcement rib portion beyond the upper surfaces thereof, an attachment hole extending through the base portion and the reinforcement rib portion, and a reduced width connecting flange portion between the reinforcement rib portion and the identification portion having spaced parallel generally vertically extending side surfaces and a laterally innermost generally vertically extending side surface; and wherein:

said first tag member supporting means comprising a first slot means, including the tag member abutment surface thereon, having a cross sectional configuration generally corresponding to the cross sectional configuration of the base portion of the first tag member and laterally confining the base portion therewithin, said first slot means having a laterally outermost opening enabling free lateral inward and outward sliding movement of the base portion laterally inwardly to the loading position prior to assembly and laterally outward to a release position after assembly; and said second tag member supporting means comprising a second slot means, including the tag member abutment surface thereon, having a cross sectional configuration generally corresponding to the cross sectional configuration of the base portion and the reinforcement rib portion and the connecting flange portion of the second tag member and laterally confining the base portion and the reinforcement rib portion and the connecting flange portion therewithin, said second slot means having laterally outermost openings enabling free lateral inward and outward sliding movement of the base portion and the reinforcement rib portion and the connecting flange portion laterally inwardly to a loaded position prior to assembly and laterally outwardly to a release position after assembly.

23. The invention as defined in claim 22 and wherein: said first slot means further comprising:
the tag abutment surface thereof being engageable with the flat lower surface of the base portion of the first tag member;
a laterally innermost abutment surface means extending generally transversely to the tag abutment surface and being engageable with the laterally innermost surface of the base portion of the first tag member;
a pair of parallel generally horizontally extending downwardly facing abutment surface means oppositely spaced from the tag abutment surface and extending along opposite sides thereof and being engageable with opposite upwardly facing side surface portions of the base portion of the first tag member opposite the flat downwardly facing lower surface thereof; and said second slot means further comprising:

the tag member abutment surface thereof engaging portions of the flat upper surface means of the base portion of the second tag member;

a second laterally innermost and laterally outwardly facing abutment surface means extending generally transversely to the tag member abutment surface for engaging the laterally innermost side surface of the base portion of the second tag member;

a third generally vertically extending flat abutment surface means extending generally transversely to tag member abutment surface for engaging the spaced parallel side surfaces of the reinforcement rib portion of the second tag member; and a fourth flat generally vertically extending abutment surface means extending generally transversely to the tag member abutment surface for engaging laterally innermost side surface portions of the connecting flange portion of the second tag member.

* * * * *